(12) United States Patent
McCubbrey

(10) Patent No.: US 7,451,410 B2
(45) Date of Patent: Nov. 11, 2008

(54) STACKABLE MOTHERBOARD AND RELATED SENSOR SYSTEMS

(75) Inventor: David L. McCubbrey, Ann Arbor, MI (US)

(73) Assignee: Pixel Velocity Inc., Ann Arbor, IL (US)

( * ) Notice: Subject to any disclaimer, the term of this patent is extended or adjusted under 35 U.S.C. 154(b) by 537 days.

(21) Appl. No.: 10/998,020

(22) Filed: Nov. 26, 2004

(65) Prior Publication Data

US 2005/0073819 A1 Apr. 7, 2005

Related U.S. Application Data

(63) Continuation-in-part of application No. 10/441,581, filed on May 19, 2003, now Pat. No. 7,073,158.

(60) Provisional application No. 60/381,295, filed on May 17, 2002.

(51) Int. Cl.
*G06F 17/50* (2006.01)
(52) U.S. Cl. .................. 716/1; 716/1; 716/12; 716/17; 716/19
(58) Field of Classification Search ..................... 716/1, 716/12, 17, 19
See application file for complete search history.

(56) References Cited

U.S. PATENT DOCUMENTS

| | | | |
|---|---|---|---|
| 6,086,629 A | 7/2000 | McGettigan et al. | |
| 6,301,695 B1 | 10/2001 | Burnham et al. | |
| 6,370,677 B1 | 4/2002 | Carruthers et al. | |
| 6,438,737 B1 * | 8/2002 | Morelli et al. | 716/16 |
| 6,457,164 B1 | 9/2002 | Hwang et al. | |
| 6,526,563 B1 | 2/2003 | Baxter | |
| 6,557,156 B1 | 4/2003 | Guccione | |
| 2003/0086300 A1 | 5/2003 | Noyes et al. | |
| 2003/0101426 A1 * | 5/2003 | Sarkinen et al. | 716/12 |
| 2003/0160980 A1 | 8/2003 | Olsson et al. | |

OTHER PUBLICATIONS

PC/104 Specification Version 2.5 Nov. 2003.
PC/104-Plus Specification Version 2.0 Nov. 2003.

* cited by examiner

*Primary Examiner*—Thuan Do
(74) *Attorney, Agent, or Firm*—Jeffrey Schox

(57) ABSTRACT

The stackable motherboard 10 of the first embodiment includes: a circuit board 19 having a first side 14 and a second side 17 opposite the first side 14, a processor 16 mounted on the circuit board 19, a first peripheral interconnect 18, and a second peripheral interconnect 90. The stackable motherboard 10 also preferably includes: a first motherboard interconnect 99 mounted on the first side 14 of the circuit board 19 and adapted to communicate data between the processor 16 and a first auxiliary motherboard, and a second motherboard interconnect 94 mounted on the second side 17 of the circuit board 19 and adapted to communicate data between the processor 16 and a second auxiliary motherboard.

24 Claims, 3 Drawing Sheets

STACKABLE MOTHERBOARD AND RELATED SENSOR SYSTEMS

CROSS-REFERENCE TO RELATED APPLICATIONS

This application is a continuation-in-part of U.S. patent application Ser. No. 10/441,581 (filed 19 May 2003 now U.S. Pat. No. 7,073,158 and entitled "Automated system for designing and developing field programmable gate arrays"), which is incorporated in its entirety by this reference. U.S. patent application Ser. No. 10/441,581 claims priority to U.S. provisional patent application Ser. No. 60/381,295 (filed 17 May 2002 and entitled "Automated System for Designing and Developing Field Programmable Gate Arrays"), which is also incorporated in its entirety by this reference.

TECHNICAL FIELD

This invention relates generally to the computer field, and more specifically to an improved architecture for stackable motherboards and to sensor systems using such stackable motherboards.

BACKGROUND

There are known benefits of using FPGAs for embedded machine vision or other image processing applications. These include processing image data at high frame rates, converting and mapping the data and performing image segmentation functions that were all previously handled by dedicated, proprietary processors. FPGAs are well-known for having a much greater power to process images, on the order of 10 to 100 times that of conventional advanced microprocessors of comparable size. This is in part a function of the fully programmed FPGA being set up as a dedicated circuit designed to perform specific tasks and essentially nothing else.

Another benefit of FPGAs is their low power consumption and low weight. FPGAs are very suitable for embedded avionic applications, in-the-field mobile vision applications and severe-duty applications, such as mobile vehicles, including those which are off-road, where severe bumps and jolts are commonplace. These applications are very demanding in that they have severe space, weight, and power constraints. Modern FPGAs now have the processing capacity on a par with dedicated application-specific integrated circuits (ASICs), and are or can be made very rugged.

FPGAs have grown in popularity because they can be programmed to implement particular logic operations and reprogrammed easily as opposed to an application specific integrated circuit (hereafter ASIC) where the functionality is fixed in silicon. But this very generic nature of FPGAs, deliberately made so they can be used in many different applications, is also a drawback due to the many difficulties associated with efficiently and quickly taking a high level design specified by a user, and translating it into a practical hardware design that meets all applicable timing, floor plan and power requirements so that it will run successfully upon the target FPGA. As is well-known, a high level user-generated design is typically specified by a sequence of matrix array or mathematic operations, including local pixel neighborhood operations (such as erosion, dilation, edge detection, determination of medial axis, etc.) and other forms of arithmetic or Boolean operations (e.g., addition, multiplication; accumulation; exclusive-OR, etc.), lookup table and shift register functions, and other functions like convolution, autocorrelation, and the like. In order to be able to handle all of this diverse logic, the individual logic blocks used in the FPGAs are made to be fairly generic.

The problem in supporting all these applications and functions is how to design reconfigurable hardware resources that provide the most effective use of general purpose FPGA silicon for the specific image processing tasks to which a given FPGA is put to use. FPGAs are by their very nature general purpose circuits that can be programmed to perform many different functions, such as digital signal processing used in wireless communication, encryption and decryption for communications over the Internet, etc.

One expected benefit of FPGAs, since they are reprogrammable, is that they would help eliminate the cost/risk of ASIC development. One of the few things really holding back the larger use of FPGAs in vision applications has been the difficulty in translating desired user-defined image processing algorithms into hardware, and the difficulty of updating those algorithms once they are in hardware. If there were a development system for the design and programming of FPGAs that greatly simplified the development of an image processing algorithm or other sequence of desired operations into the bitstream coding required to program FPGAs, this might well open up opportunities for wider use of FPGAs in such applications as medical, automotive collision avoidance and commercial video.

For example, in the medical area, many medical imaging techniques have extremely high processing requirements. FPGAs, assuming that they can be programmed with the desired sequence of complex image processing steps, should produce smaller, faster and less expensive versions of existing image processing devices that presently require ASIC devices be developed. In addition, many new applications will become possible for the first time, because FPGAs can give speedups of one, two and even three orders of magnitude over PCs, at a reasonable price. Automotive vision applications that are on the horizon include proposals to help enhance driver situational awareness. Possible automotive vision applications include systems to assist with lane-changes, to provide backup obstacle warnings, and to provide forward collision warnings.

Commercial video FPGAs, if they were much easier to design, program and test, would likely find much wider use in video transcoders, compression, encryption and standards support, particularly in areas like MPEG-4. Many video applications are already being done with FPGAs, but the design, development and testing of such FPGAs is at present very labor-intensive in terms of designer and engineering services, which drives up unit costs and slows down the transfer of proposed designs into actual commercial embodiments.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
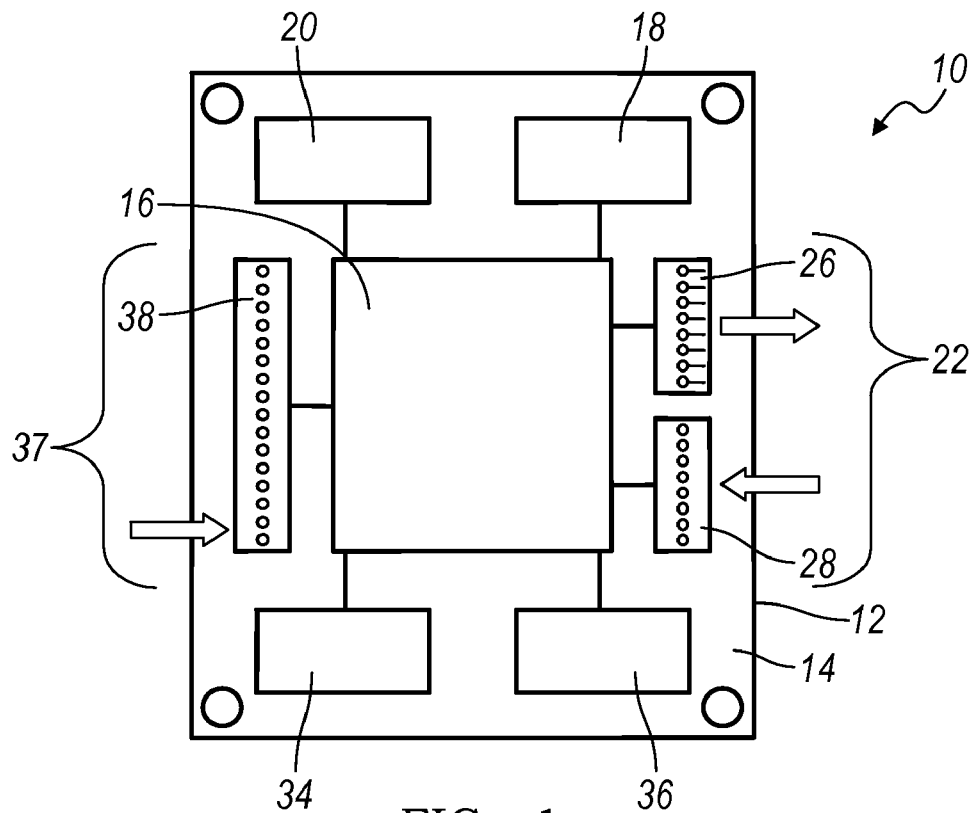
FIGS. 1 and 2 are representations of the first side and the second side, respectively, of the stackable motherboard of the preferred embodiments.
Figure 2:
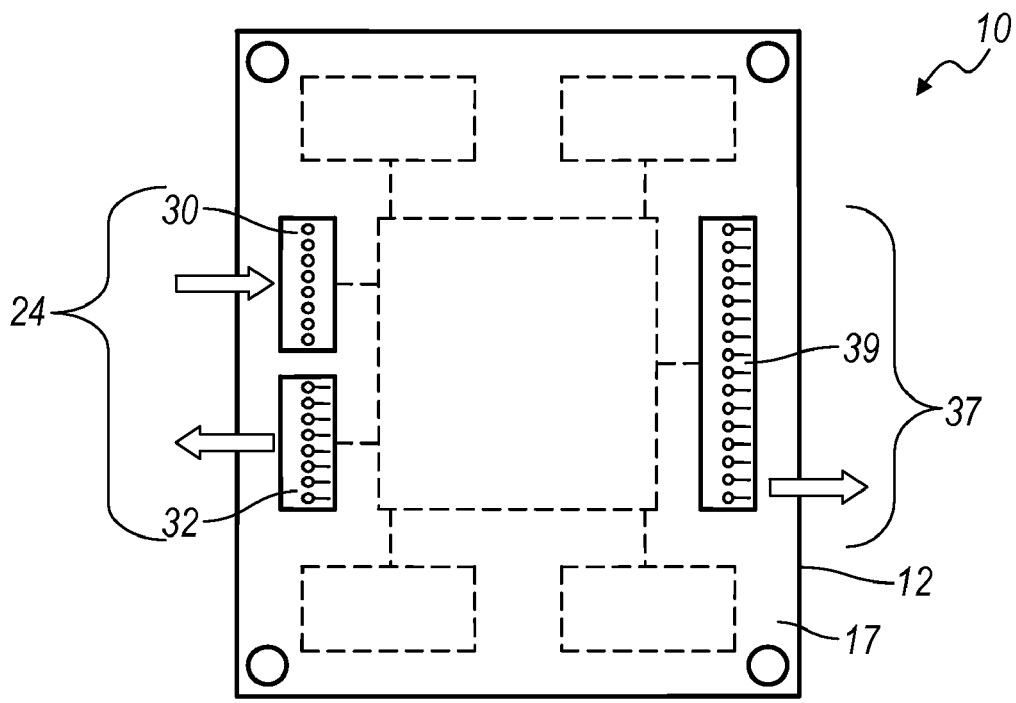

As shown in FIGS. 1 and 2, the stackable motherboard 10 of the first embodiment includes: a circuit board 12 having a first side 14 and a second side 17 opposite the first side 14, a processor 16 mounted on the circuit board 12, a first peripheral interconnect 18, and a second peripheral interconnect 20. The stackable motherboard 10 also preferably includes: a first motherboard interconnect 22 mounted on the first side 14 of the circuit board 12 and adapted to communicate data between the processor 16 and a first auxiliary motherboard, and a second motherboard interconnect 24 mounted on the second side 17 of the circuit board 12 and adapted to communicate data between the processor 16 and a second auxiliary motherboard. The stackable motherboard 10 has been specifically designed to exploit the features and attributes of the "LiquidGates" software tool taught in U.S. patent application Ser. No. 10/441,581 and developed by Pixel Velocity (the assignee of this invention). The stackable motherboard 10 may, however, be used in any suitable environment for any suitable reason.

The circuit board 12 of the first embodiment functions as a base for the other elements. The circuit board 12 is preferably rectangular and planar, with a first side 14 and a second side 17 opposite the first side 14. The first side 14 and the second side 17 function to facilitate stacking of the stackable motherboard 10 with other motherboards. The circuit board 12 may, however, be any suitable shape that has opposing sides. The circuit board 12 is preferably rigid, but may alternatively be partially or completely flexible. The circuit board 12 is preferably made of a conventional epoxy and fiberglass composition and with conventional manufacturing processes, but may alternatively be made of any suitable material and with any suitable manufacturing process.

The processor 16 of the first embodiment functions to process digital signals as a DSP. More preferably, the processor 16 functions to process digital images and to facilitate one or more of the following features: geometric transformations such as enlargement, reduction, and rotation; color corrections such as brightness and contrast adjustments; combination of two or more images into an average, blend, difference, or image composite; interpolation, demosaicing, and recovery of a full image from a mosaic image (e.g. a Bayer pattern, etc.); noise reduction and other types of filtering and signal averaging; edge detection and other local operators; and segmentation of the image into regions. The processor 16 may, however, function to process other suitable digital signals and to facilitate other suitable features.

The processor 16 is preferably a reconfigurable processor, such as a Field Programmable Gate Array (FPGA) sold under the Virtex brand by Xilinx, Inc. The processor 16 may, however, be any other suitable FPGA (such as an FPGA from Altera), may be any suitable reconfigurable processor (such as a PicoArray from PicoChip), or may be any suitable DSP (such as other application specific integrated circuits). The processor 16 of the preferred embodiments is preferably mounted on the circuit board 12 with conventional techniques, but may be coupled to the circuit board 12 with any suitable device or any suitable method.

The processor 16 of alternative embodiments may function to interpret and perform instructions as a CPU and may include a control unit that directs program flow and one or more execution units that perform data operations. In this alternative embodiment, the processor may be a microprocessor 50 sold under the Pentium brand by Intel Corporation. Furthermore, although the processor 16 preferably functions in real-time, the processor 16 may alternatively operate batch jobs.

The first peripheral interconnect 18 and the second peripheral interconnect 20 of the first embodiment function to connect daughterboard cards and other suitable devices to the processor 16. By including both the first peripheral interconnect 18 and the second peripheral interconnect 20 on the stackable motherboard 10, a sensor system 42 may include only one stackable motherboard 10. The first peripheral interconnect 18 and the second peripheral interconnect 20 are preferably an interconnect chosen from the following group: Ethernet, CameraLink, SCSI, USB, Firewire, Bluetooth, and WiFi. The first peripheral interconnect 18 and the second peripheral interconnect 20 may alternatively be any suitable interconnect that facilitates connection between the processor 16 and another device.

The first motherboard interconnect 22, which is preferably coupled to the processor 16 and mounted on the first side 14 of the circuit board 12, functions to communicate data between the processor 16 and a first auxiliary motherboard. The first motherboard interconnect 22 preferably includes a first output portion 26 adapted to communicate data from the processor 16 to the first auxiliary motherboard, and a first input portion 28 adapted to communicate data from the first auxiliary motherboard to the processor 16. The first motherboard interconnect 22 may alternatively include a single portion adapted to communicate data in two directions. The first motherboard interconnect 22 preferably includes two point-to-point LVDS buses, each with multiple signal pairs (preferably 1 clock and at least 3 data bits). The first motherboard interconnect 22 may alternatively include any other suitable device to communicate data between the processor 16 and the first auxiliary motherboard.

The second motherboard interconnect 24, which is preferably coupled to the processor 16 and mounted on the second side 17 of the circuit board 12, functions to communicate data between the processor 16 and a second auxiliary motherboard. Similar to the first motherboard interconnect 22, the second motherboard interconnect 24 preferably includes a second output portion 30 adapted to communicate data from the processor 16 to the second auxiliary motherboard, and a second input portion 32 adapted to communicate data from the second auxiliary motherboard to the processor 16. The second motherboard interconnect 24 may alternatively include a single portion adapted to communicate data in two directions. The second motherboard interconnect 24 preferably includes two point-to-point LVDS buses, each with multiple signal pairs (preferably 1 clock and at least 3 data bits). The second motherboard interconnect 24 may alternatively include any other suitable device to communicate data between the processor 16 and the second auxiliary motherboard.

The first motherboard interconnect 22 and the second motherboard interconnect 24 are preferably complimentarily located on either side of the stackable motherboard 10 and are preferably projecting in opposing directions. In this manner, the stackable motherboard 10 becomes both modular and stackable. The first motherboard interconnect 22 and the second motherboard interconnect 24 may alternatively be located in any suitable location.

The stackable motherboard 10 of the first embodiment also preferably includes a first memory 34 coupled to the processor 16. The first memory 34 functions to support local processing by the processor 16. The first memory 34 is preferably a Synchronous Dynamic Random Access Memory (SDRAM) or other random access memory with synchronous technology. The synchronous feature of the first memory 34 allows for much higher clock speeds. The first memory 34 may, however, be any suitable RAM or other suitable memory device that supports the local processing by the processor 16.

The stackable motherboard 10 of the first embodiment also preferably includes a second memory 36 coupled to the processor 16. Like the first memory 34, the second memory 36 functions to support local processing by the processor 16. The second memory 36 is preferably a Synchronous Dynamic Random Access Memory (SDRAM) or other random access memory with synchronous technology. The synchronous feature of the second memory 36 allows for much higher clock speeds. The second memory 36 may, however, be any suitable RAM or other suitable memory device that supports the local processing by the processor 16.

The stackable motherboard 10 of the first embodiment also includes a bus 37 coupled to the processor 16. The bus 37 functions to supply power, global signals, and programming to the processor 16. The bus 37 is preferably mounted with an input section 38 on the first side 14 of the circuit board 12, and an output section 39 on the second side 17 of the circuit board 12. The bus 37 may alternatively be mounted in any suitable manner. The bus 37 is preferably a RS-232 serial port, but may be any other suitable device.

Figure 3:
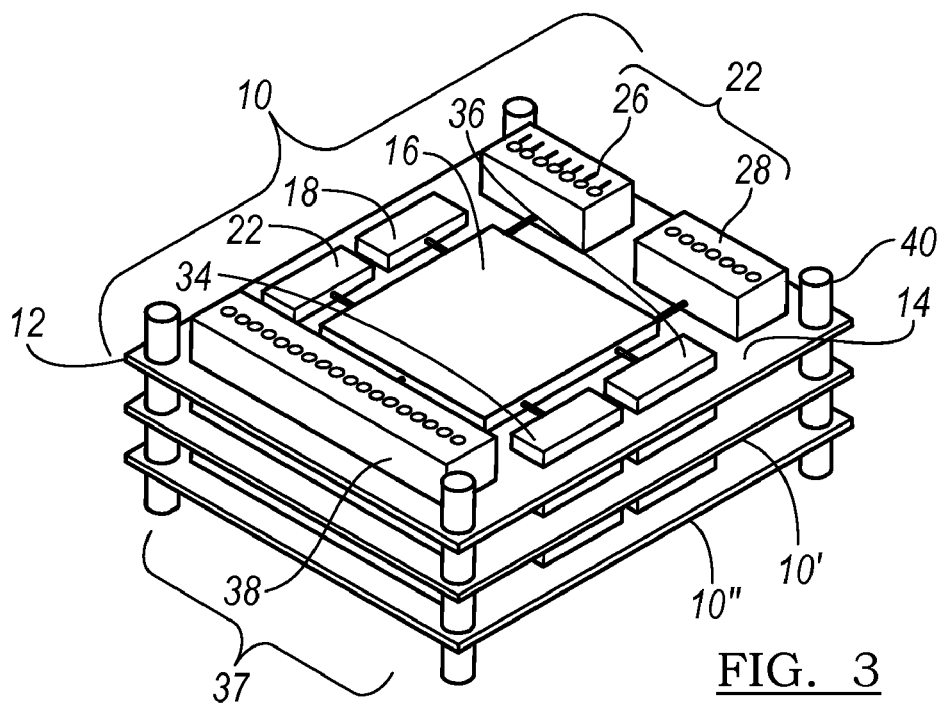
FIG. 3 is a representation of several stackable motherboards in a sensor system.

As shown in FIG. 3, the stackable motherboard 10 of the first embodiment also preferably includes spacers 40. The spacers 40 function to physically connect adjacent stackable motherboards 10, while holding the adjacent stackable motherboards 10 at a fixed distance. The fixed distance preferably allows for proper heat dissipation, but this feature may be accomplished with other suitable devices. The spacers 40 are preferably made of a lightweight metal and with conventional manufacturing techniques, but may be made of any suitable material and with any suitable process.

Figure 4:
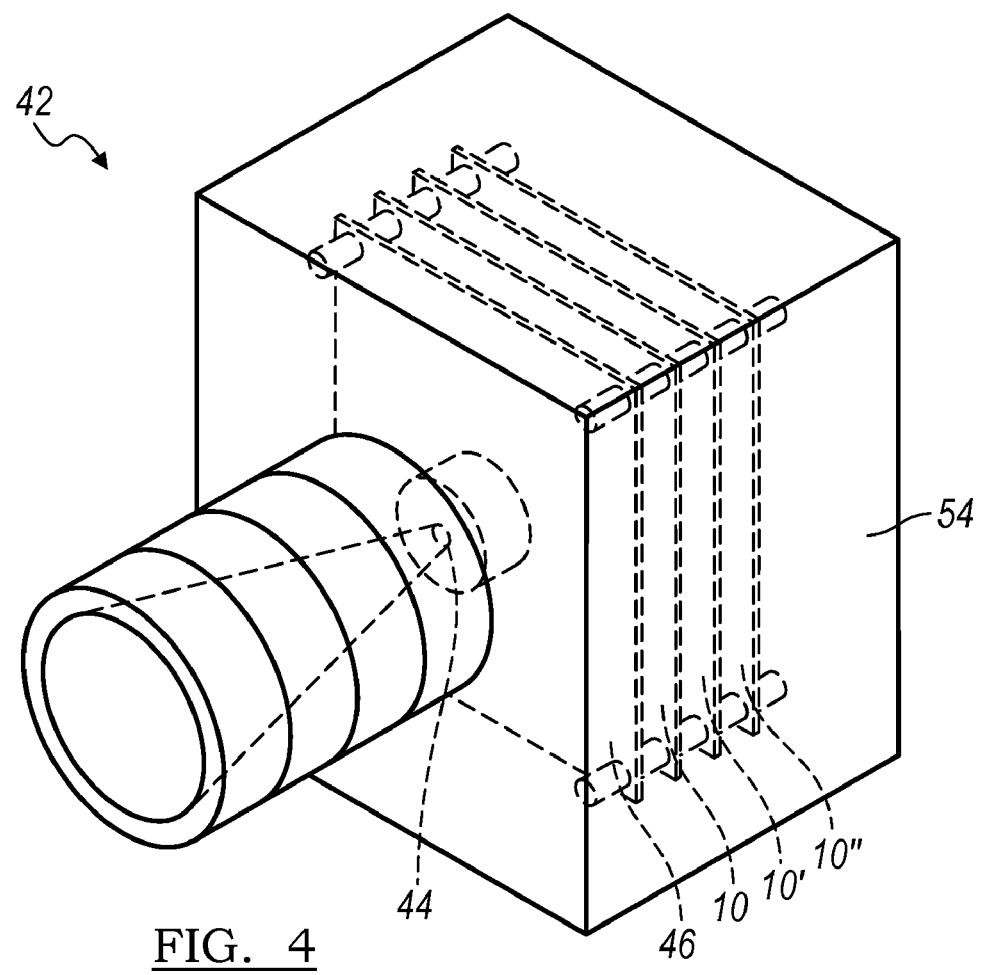
FIG. 4 is a representation of several stackable motherboards in a sensor system, adapted to capture visible images.

As shown in FIG. 4, the sensor system 42 of the second embodiment includes a sensor device 44, a first stackable motherboard 10 as defined in the first embodiment, and a daughterboard 46. The sensor system 42 of the second embodiment has been specifically designed to capture and process information such as visible images and ultrasonic echoes, but may alternatively be used to capture and process any suitable information.

The sensor device 44 of the second embodiment functions to receive information. In a first variation, the sensor device 44 specifically functions to capture visible images. In this variation, the sensor device 44 is preferably a Charge Coupled Device (CCD), but may alternatively be an array of Complementary Metal-Oxide-Semiconductors (CMOS) or any other suitable device that captures visible images. In a second variation, the sensor device 44 specially functions to capture IR images (also known as thermal images). In this variation, the sensor device 44 is preferably a preferably a Thermopile Array with an infrared LED for illumination, but may alternatively be any suitable device or combination that captures thermal information. In a third variation, the sensor device 44 specifically functions to capture three-dimensional information of an object. In this variation, the sensor device 44 is preferably three arrays that collect the phase and/or polarization information of an optical electric field, but may alternatively be any suitable device to capture three-dimensional information of an object. In a fourth variation, the sensor device 44 specifically functions to both generate ultrasonic pulses and to capture ultrasonic echoes. In this variation, the sensor device 44 is preferably an array of piezoelectric crystals, but may alternatively be an array of Capacitor Micromachined Ultrasonic Transducers (cMUT) or any other suitable device that both generates ultrasonic pulses and captures ultrasonic echoes. In a fifth variation, the sensor device 44 functions to capture at least two types of complementary information, such as both visible and IR image information (with either similar or differing resolutions). In this variation, the sensor device 44 may include two or more suitable devices, and the processor may function to combine the multiple sets of information into a single unified set (a process commonly known as "sensor fusion"). In a sixth variation, the sensor device 44 may be any other suitable device that receives information.

The daughterboard 46 of the second embodiment functions to communicate the received information between the sensor device 44 and the first peripheral interconnect 18 of the first stackable motherboard 10. The daughterboard 46 is preferably made of a similar composition and with similar techniques as the first stackable motherboard 10, but may alternatively be made of any suitable material and with any suitable processes.

Figure 5:
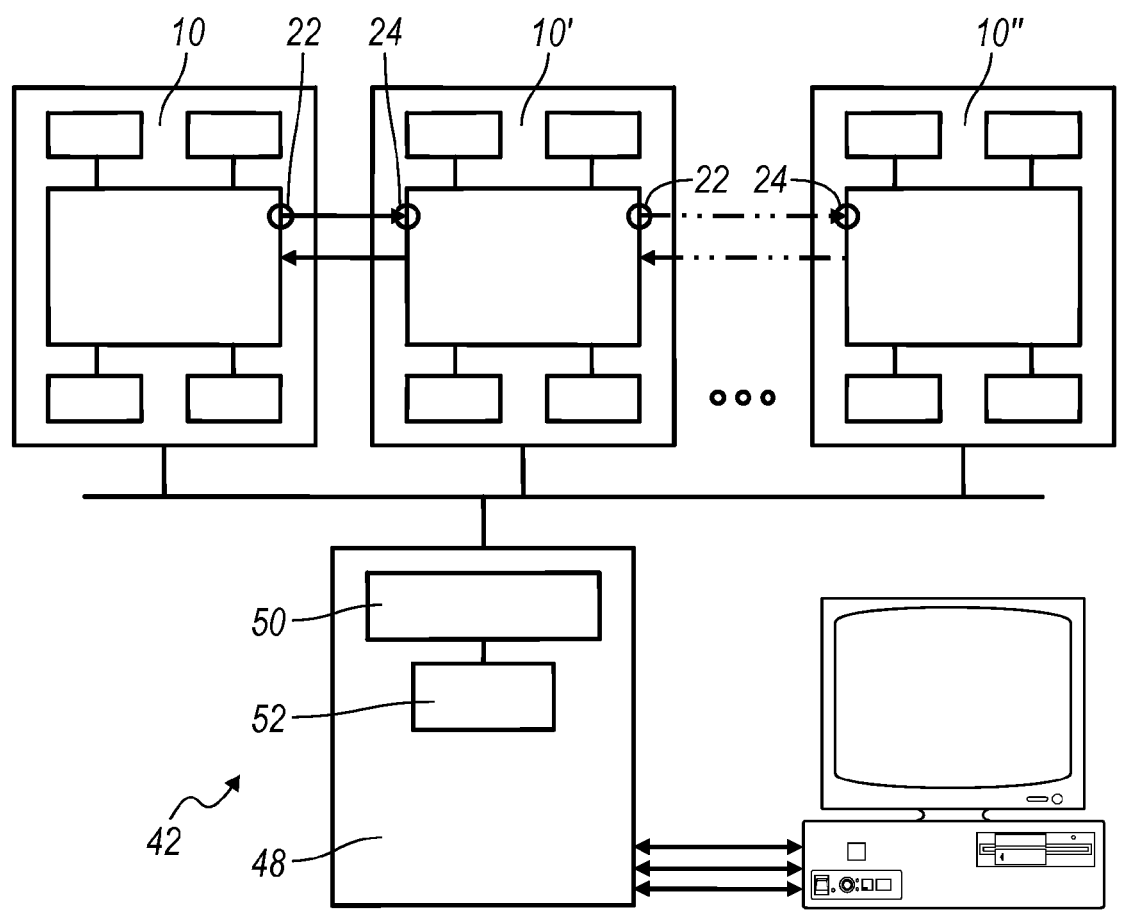
FIG. 5 is a schematic of several stackable motherboards in a sensor system.

As shown in FIG. 5, the sensor device 44 of the second embodiment also preferably includes a second stackable motherboard 10' as defined in the first embodiment. Preferably, the first motherboard interconnect 22 of the first stackable motherboard 10 is connected to communicate data with the second motherboard interconnect 24 of the second stackable motherboard 10'. Alternatively, the first stackable motherboard and the second stackable motherboard 10' may be coupled in any suitable manner.

The sensor device 44 of the second embodiment also preferably includes a third stackable motherboard 10" as defined in the first embodiment. Preferably, the first motherboard interconnect 22 of the second stackable motherboard 10' is connected to communicate data with the second motherboard interconnect 24 of the third stackable motherboard 10". Alternatively, the second stackable motherboard 10' and the third stackable motherboard 10" may be coupled in any suitable manner.

The sensor device 44 of the second embodiment also preferably includes a controller 48 that functions to control the stackable motherboards 10. The controller 48 preferably includes a microprocessor 50 and memory 52, but may alternatively include any suitable device(s). Further, the sensor device 44 of the second embodiment also preferably includes a housing 54 that functions to house the stackable motherboards 10 and the controller 48. The housing 54 is preferably made of a metallic material (to provide ruggedness), but may be made of any suitable material.

The method of the third embodiment allows for the formation of the sensor system of the second embodiment. The method preferably the following steps: (a) providing a series of the stackable motherboards, (b) providing a series of the sensor devices, (c) providing a series of the daughterboards, and (d) combining one of the daughterboards, one of the sensor devices, and one or more of the stackable motherboards to form a first sensor system.

The method of the third embodiment may include a first variation to form a first sensor system that captures and processes visible images. In this first variation, the sensor devices may be adapted to capture and process visible images and the daughterboards may be adapted to communicate the captured visible images between the first sensor device and a first peripheral interconnect of the stackable motherboard. Further, in this variation, two or more stackable motherboards may be combined to form the first sensor system with enough processing power to capture and process visible images.

The method of the third embodiment may include a second variation to form a second sensor system that captures and processes ultrasound echoes. In this second variation, the sensor devices may be adapted capture ultrasound echoes and the daughterboards may be adapted to communicate the captured ultrasound echoes between the second sensor device and a first peripheral interconnect of the stackable motherboard. Further, in this variation, preferably two or more stackable motherboards, and more preferably three or more stackable motherboards, may be combined to form the second sensor system with enough processing power to capture and process ultrasonic echoes.

The method of the third embodiment may include a third variation to form both the first sensor system and the second system using the same series of stackable motherboards. The method of the third embodiment may include a fourth variation to provide a first series of the stackable motherboards with a first processor and to provide a second series of the stackable motherboards with a second processor. The first processor and the second processor may differ in a suitable parameter, such as capacity. Except for the difference between the first processor and the second processor, the first series of the stackable motherboards and the second series of the stackable motherboards are substantially similar.

In both the first and second variations of the third embodiment, economies of scale can be realized based on the use of multiple stackable motherboards in the same product line. In the third variation, greater economies of scale may be realized based on the use of multiple stackable motherboards across different product lines. In the fourth variation, even greater economies of scale may be realized based on the use of the same circuit board, first peripheral interconnect, second peripheral interconnect, first motherboard interconnect, and second motherboard interconnect across different product lines. The method of the third embodiment may, of course, include other suitable modifications that do not disrupt the general goal of the formation of sensor systems.

As a person skilled in the art will recognize from the previous detailed description and from the figures and claims, modifications and changes can be made to the preferred embodiments of the invention without departing from the scope of this invention defined in the following claims.

I claim:

1. A system adapted to receive information from a sensor device, comprising:
    a stackable motherboard including:
        a circuit board having a first side and a second side opposite the first side;
        a processor mounted on the circuit board;
        a first peripheral interconnect coupled to the processor;
        a second peripheral interconnect coupled to the processor;
        a first motherboard interconnect coupled to the processor, mounted on the first side of the circuit board, and adapted to communicate data between the processor and a first auxiliary motherboard;
        a second motherboard interconnect coupled to the processor, mounted on the second side of the circuit board, and adapted to communicate data between the processor and a second auxiliary motherboard; and
    a daughterboard adapted to communicate received information between a sensor device and the first peripheral interconnect of the first stackable motherboard.

2. The system of claim 1, wherein the processor of the stackable motherboard includes a reconfigurable processor.

3. The system of claim 2, wherein the reconfigurable processor includes a field programmable gate array.

4. The system of claim 1, wherein the first motherboard interconnect of the stackable motherboard includes an output portion adapted to communicate data from the processor to a first auxiliary motherboard, and wherein the first motherboard interconnect includes an input portion adapted to communicate data from the first auxiliary motherboard to the processor.

5. The system of claim 4, wherein the second motherboard interconnect of the stackable motherboard includes an input portion adapted to communicate data from the second auxiliary motherboard to the processor, wherein the second motherboard interconnect includes an output portion adapted to communicate data from the processor to the second auxiliary motherboard.

6. The system of claim 1, wherein the first motherboard interconnect and the second motherboard interconnect of the stackable motherboard are complimentarily located on either side of the motherboard.

7. The system of claim 1, further including a first memory coupled to the processor of the stackable motherboard.

8. The system of claim 7, further including a second memory coupled to the processor of the stackable motherboard.

9. The system of claim 1, further including a bus coupled to the processor of the stackable motherboard and adapted to supply at least one of the following: power, global signals, and programming.

10. A sensor system, comprising:
    a sensor device adapted to receive information;
    a first stackable motherboard, including:
        a circuit board having a first side and a second side opposite the first side;
        a processor mounted on the circuit board;
        a first peripheral interconnect coupled to the processor;
        a second peripheral interconnect coupled to the processor;
        a first motherboard interconnect coupled to the processor, mounted on the first side of the circuit board, and adapted to communicate data between the processor and a first auxiliary motherboard;
        a second motherboard interconnect coupled to the processor, mounted on the second side of the circuit board, and adapted to communicate data between the processor and a second auxiliary motherboard; and
    a daughterboard adapted to communicate the received information between the sensor device and the first peripheral interconnect of the first stackable motherboard.

11. The sensor system of claim 10, wherein the sensor device is further adapted to capture visible images.

12. The sensor system of claim 11, further including a second stackable motherboard, wherein the first motherboard interconnect of the first stackable motherboard is adapted to communicate data with a second motherboard interconnect of the second stackable motherboard.

13. The sensor system of claim 10, wherein the sensor device is further adapted to capture ultrasound echoes.

14. The sensor system of claim 13, further including a second stackable motherboard, wherein the first motherboard interconnect of the first stackable motherboard is adapted to communicate data with a second motherboard interconnect of the second stackable motherboard.

15. The sensor system of claim 14, further including a third stackable motherboard, wherein a first motherboard interconnect of the second stackable motherboard is adapted to communicate data with a second motherboard interconnect of the third stackable motherboard.

16. A method of supplying motherboards and forming at least one sensor system comprising the following steps:
   a) providing a series of stackable motherboards, each including:
      a circuit board having a first side and a second side opposite the first side; a processor mounted on the circuit board;
      a first peripheral interconnect coupled to the processor;
      a second peripheral interconnect coupled to the processor;
      a first motherboard interconnect coupled to the processor, mounted on the first side of the circuit board, and adapted to communicate data between the processor and a first auxiliary motherboard; and
      a second motherboard interconnect coupled to the processor, mounted on the second side of the circuit board, and adapted to communicate data between the processor and a second auxiliary motherboard;
   b) providing a series of first sensor devices, each adapted to capture visible images;
   c) providing a series of first daughterboards, each adapted to communicate the captured visible images between a first sensor device and a first peripheral interconnect of a stackable motherboard; and
   d) combining one of the first daughterboards, one of the first sensor devices, and one or more of the stackable motherboards to form a first sensor system adapted to capture and process visible images.

17. The method of claim 16, wherein step (d) includes combining one of the first daughterboards, one of the first sensor devices, and two or more of the stackable motherboards to form a first sensor system adapted to capture and process visible images.

18. The method of claim 17, further including the following steps:
   e) providing a series of second sensor devices, each adapted to capture ultrasound echoes;
   f) providing a series of second daughterboards, each adapted to communicate the captured ultrasound echoes between a second sensor device and a first peripheral interconnect of a stackable motherboard; and
   g) combining one of the second daughterboards, one of the second sensor devices, and one or more of the stackable motherboards to form a second sensor system adapted to capture and process ultrasound echoes.

19. The method of claim 18, wherein step (g) includes combining one of the second daughterboards, one of the second sensor devices, and two or more of the stackable motherboards to form a second sensor system adapted to capture and process ultrasound echoes.

20. The method of claim 19, wherein step (g) includes combining one of the second daughterboards, one of the second sensor devices, and three or more of the stackable motherboards to form a second sensor system adapted to capture and process ultrasound echoes.

21. A sensor system, comprising:
   a stackable motherboard, including:
      a circuit board having a first side and a second side opposite the first side;
      a processor mounted on the circuit board;
      a first peripheral interconnect coupled to the processor;
      a second peripheral interconnect coupled to the processor;
      a first motherboard interconnect coupled to the processor, mounted on the first side of the circuit board, and adapted to communicate data between the processor and a first auxiliary motherboard; and
      a second motherboard interconnect coupled to the processor, mounted on the second side of the circuit board, and adapted to communicate data between the processor and a second auxiliary motherboard; and
   a sensor device adapted to receive information, and communicate the received information to the first peripheral interconnect of the stackable motherboard.

22. The sensor system of claim 21, wherein the first motherboard interconnect of the stackable motherboard includes an output portion adapted to communicate data from the processor to a first auxiliary motherboard, and wherein the first motherboard interconnect includes an input portion adapted to communicate data from the first auxiliary motherboard to the processor.

23. The sensor system of claim 22, wherein the second motherboard interconnect of the stackable motherboard includes an input portion adapted to communicate data from the second auxiliary motherboard to the processor, wherein the second motherboard interconnect includes an output portion adapted to communicate data from the processor to the second auxiliary motherboard.

24. The sensor system of claim 21, wherein the first motherboard interconnect and the second motherboard interconnect of the stackable motherboard are complimentarily located on either side of the motherboard.

* * * * *